United States Patent

[11] 3,596,916

[72] Inventor Rudolf Gottschald, deceased
late of Osterath, Germany (by Erika
Gottschald, nee Schlenstedt, heir, of Am
Meerbusch 4, 4151 Osterath, Germany)
[21] Appl. No. 730,520
[22] Filed May 20, 1968
[45] Patented Aug. 3, 1971
[32] Priority May 23, 1967
[33] Germany
[31] P 16 00 452.7

[54] SEALING BELLOWS FOR BALL JOINTS
2 Claims, 4 Drawing Figs.
[52] U.S. Cl. .................................................. 277/212
FB, 287/90 R
[51] Int. Cl. ................................................. F16j 3/00
[50] Field of Search .......................................... 277/212,
212 C, 212 F, 212 FB; 287/87, 90, 90 A, 90 B, 90 C

[56] References Cited
UNITED STATES PATENTS
3,208,290 9/1965 Mathues et al. .............. 287/90 A X
3,355,199 11/1967 Melton et al. ................. 287/90 A
FOREIGN PATENTS
1,093,683 11/1960 Germany ..................... 287/90 C
954,690 4/1964 Great Britain ................ 287/90 A Primary Examiner—Robert I. Smith
Attorney—Walter Becker ABSTRACT: A sealing bellows for a ball joint having its ball stud normally eccentrically located with regard to the ball joint housing, in which said bellows is asymmetric with an unilaterally enlarged bulge.

Patented Aug. 3, 1971          3,596,916

INVENTOR.

BY

SEALING BELLOWS FOR BALL JOINTS

The present invention concerns a sealing bellows for sealing the housing opening of a ball joint with a ball stud which in its normal position is eccentrically located. The present invention is particularly directed to ball joints for motor vehicles. Sealing bellows of the above-mentioned type are necessary not only for protecting the ball joint against the entry of soil and water but also to prevent the escape of lubricant.

The heretofore-known sealing bellows for ball joints are provided with a smaller opening for the passage of the ball stud and with a larger opening for connecting the bellows to the housing.

It is an object of this invention to provide a sealing bellows which will permit a reliable sealing of a ball joint while the ball stud, when occupying its normal position, is eccentrically arranged and is tilted from said eccentric position during the actuation of the joint.

It is another object of this invention to provide a ball joint with a bellows as set forth above which is simple in construction and reliable in operation.

These and other objects and advantages of the invention will appear more clearly from the following specification in connection with the accompanying drawing, in which.

Figure 1:
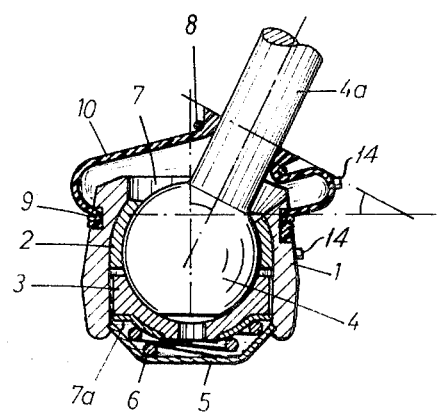
FIG. 1 is a vertical section through a ball joint of a customary design with a sealing bellows according to the invention, said bellows occupying a position corresponding to the normal position of the ball joint.

The present invention has realized the above-outlined objects by designing the bellows asymmetric with a unilateral bulge. In conformity with the present invention, the surfaces of the small and the large opening of the bellows are directed at an acute angle with regard to each other, said acute angle corresponding to the angle between the centerline of the ball joint and the centerline of the ball stud in its eccentric normal position.

In order to be sure that the bellows, when being assembled, will be placed in proper position upon the housing and will be held in this position during operation, the bellows may be provided with markings or the like which either indicate the position on the housing or bring about a positive engagement therewith.

Referring now to the drawing in detail, the ball joint comprises a housing 1 having arranged therein two bearing cups 2 and 3 which receive a ball head 4 having connected thereto a ball stud 4a. Ball stud 4a protrudes through one housing opening which latter may be designed as an oblong opening 7. An assembly opening 7a opposite to the mounting opening 7 is closed by a cover 5. A spring 6 rests against the cover 5 and presses the lower bearing cup 3 against the ball head 4.

Figure 2:
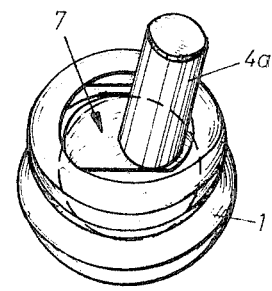
FIG. 2 is a perspective top view of the ball joint according to FIG. 1 without sealing bellows.

The normal position of the ball stud 4a is shown in FIG. 1. The ball stud 4a, when occupying this position, forms an angle with regard to the longitudinal centerline of the housing 1 as is also evident from the perspective drawing of FIG. 2. The sealing bellows 10 provided against the entry of soil and water and also for preventing the escape of lubricant, is connected to the ball stud 4a by means of a ring member 8 and in a recess of the housing 1 is connected to the latter by means of a ring member 9.

Figure 3:
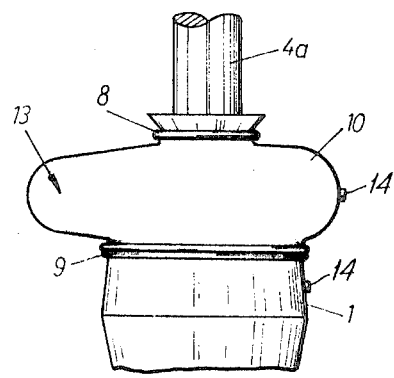
FIG. 3 represents a side view of the ball joint according to FIG. 1 with the ball stud occupying a central position.

In order to assure that in the eccentric normal position of the sealing bellows 10 no forces act upon the sealing bellows 10, and that consequently no reaction forces are exerted upon the ball stud 4a, the sealing bellows is provided with a bulge 13 which is particularly clearly shown in FIG. 3. This design shows the form of sealing bellows 10 when the ball stud 4a is tilted into the central position.

Figure 4:
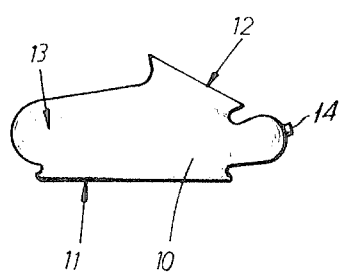
FIG. 4 shows the sealing bellows according to the invention prior to its assembly.

In order to obtain the said bulge 13, the sealing bellows 10 is shown in FIG. 4 in a position in which the opening surface of the small opening 12 is, in order to permit the passage of the ball stud 4a, arranged at an acute angle with regard to the opening surface of the large opening 11 for connection to the housing 1, said acute angle corresponding to the angle between the centerline of the ball joint and the centerline of the ball stud 4a when occupying its eccentric normal position.

In this way a shape is obtained which will assure a good seal of the interior of the ball joint without disadvantageous reaction upon the movability of the ball stud 4a. Due to the fact that in the eccentric normal position of the ball stud 4a the sealing bellows 10 is not subjected to any pulling or pushing forces, the lifespan of the bellows is increased. In order to be sure that the sealing bellows, when being assembled, will be placed upon the housing 1 in proper position and furthermore to assure that the bellows will be held in this position during the operation of the ball joint, the bellows may be provided with markings or the like which in the last-mentioned instance, in addition to indicating the correct assembly, will also prevent the sealing bellows 10 from slipping.

As will be seen from the above, the sealing bellows according to the invention for ball joints has the advantage that in the eccentric normal position of the ball stud no forces are exerted upon the bellows and thereby no reaction forces are exerted upon the ball stud. This in turn results in a longer lifespan of the sealing bellows.

It is, of course, to be understood that the present invention is by no means, limited to the particular design shown in the drawing but also comprises any modifications within the scope of the appended claims.

What is claimed is:

1. A sealing bellows for a ball joint in which the ball is received in a socket in a housing with the axis of the ball stud normally at an acute angle to the axis of the housing, said sealing bellows having a large opening on one end to encircle the housing for sealing of that end, a smaller opening on the opposite end to encircle the ball stud for sealing at that end, the plane of said second opening being normally at an acute angle to the plane of said larger opening, said bellows intermediate its ends extending radially outwardly from the axis of said socket on the side of said acute angle a greater distance than on its opposite side to form a radial asymmetric bulge on the side of said acute angle, so that as said ball stud moves toward a position coaxial with said socket, the circumferential wall portion of said bellows will be flexed without substantially stretching the material and without exerting force on the sealing ends of the bellows.

2. A sealing bellows combination according to claim 1, in which the asymmetric bellows is provided with marking means to indicate the proper assembly position of said asymmetric bellows relative to the housing to which it is connected.